United States Patent
Nishimoto et al.

(10) Patent No.: US 9,428,660 B2
(45) Date of Patent: *Aug. 30, 2016

(54) OIL-BASED INK COMPOSITION

(71) Applicant: HITACHI MAXELL, LTD., Ibaraki-shi, Osaka (JP)

(72) Inventors: Tomohisa Nishimoto, Ibaraki (JP); Miyuki Dobata, Ibaraki (JP); Kanryo Terasawa, Ibaraki (JP)

(73) Assignee: HITACHI MAXELL, LTD., Ibaraki-Shi (JP)

( * ) Notice: Subject to any disclaimer, the term of this patent is extended or adjusted under 35 U.S.C. 154(b) by 78 days.

This patent is subject to a terminal disclaimer.

(21) Appl. No.: 14/161,483

(22) Filed: Jan. 22, 2014

(65) Prior Publication Data

US 2014/0135432 A1    May 15, 2014

Related U.S. Application Data

(62) Division of application No. 12/280,962, filed as application No. PCT/JP2007/055046 on Mar. 14, 2007, now Pat. No. 8,669,318.

(30) Foreign Application Priority Data

Mar. 17, 2006 (JP) ................ 2006-075299

(51) Int. Cl.
| | | |
|---|---|---|
| *C09D 11/30* | (2014.01) | |
| *C09D 11/36* | (2014.01) | |
| C09D 11/40 | (2014.01) | |
| C09D 11/322 | (2014.01) | |

(52) U.S. Cl.
CPC ............... *C09D 11/30* (2013.01); *C09D 11/36* (2013.01); *C09D 11/322* (2013.01); *C09D 11/40* (2013.01)

(58) Field of Classification Search
CPC ..... C09D 11/36; C09D 11/30; C09D 11/322; C09D 11/40
See application file for complete search history.

(56) References Cited

U.S. PATENT DOCUMENTS

| | | |
|---|---|---|
| 5,334,435 A | 8/1994 | Rossi et al. |
| 5,431,722 A | 7/1995 | Yamashita et al. |
| 7,014,698 B2 | 3/2006 | Mizutani et al. |
| 7,021,752 B2 | 4/2006 | Satoh et al. |
| 7,132,013 B2 | 11/2006 | Mizutani et al. |
| 7,156,909 B2 | 1/2007 | Oyanagi et al. |
| 8,669,318 B2 * | 3/2014 | Nishimoto et al. ........... 524/500 |
| 2002/0139280 A1 | 10/2002 | Ichikawa |
| 2003/0029355 A1 | 2/2003 | Miyabayashi |
| 2003/0069329 A1 | 4/2003 | Kubota et al. |
| 2004/0254265 A1 * | 12/2004 | Mizutani et al. ............. 523/160 |
| 2006/0272547 A1 | 12/2006 | Mizutani et al. |

FOREIGN PATENT DOCUMENTS

| | | |
|---|---|---|
| JP | 63-51483 A | 3/1988 |
| JP | 63-113090 A | 5/1988 |
| JP | 5-186724 A | 7/1993 |
| JP | 6-166840 A | 6/1994 |
| JP | 8-6057 B2 | 1/1996 |
| JP | 8-302265 A | 11/1996 |
| JP | 8-319446 A | 12/1996 |
| JP | 2734032 B2 | 3/1998 |
| JP | 11-116879 A | 4/1999 |
| JP | 2000-212495 A | 8/2000 |
| JP | 2001-220527 A | 8/2001 |
| JP | 2002-60669 A | 2/2002 |
| JP | 2003-96347 A | 4/2003 |
| JP | 2003-238866 A | 8/2003 |
| JP | 2003-321638 A | 11/2003 |
| JP | 2004-67769 A | 3/2004 |
| JP | 2004-262985 A | 9/2004 |
| JP | 2004-331691 A | 11/2004 |
| JP | 2005-23099 A | 1/2005 |
| JP | 2005-23298 A | 1/2005 |
| JP | 2005-41983 A | 2/2005 |
| WO | WO 02/055619 A1 | 7/2002 |

OTHER PUBLICATIONS

Japanese Office Action issued on Sep. 7, 2010 in corresponding Japanese Patent Application No. 2006-075299.
Search Report mailed Oct. 27, 2010 in European Patent Application No. 07738517.7.

* cited by examiner

*Primary Examiner* — Michael Pepitone
(74) *Attorney, Agent, or Firm* — Birch, Stewart, Kolasch & Birch, LLP

(57) ABSTRACT

An oil-based ink composition comprising a colorant, an organic solvent and a polymeric compound, and optionally an alkylamine ethylene oxide derivative as a pH adjusting agent, in which the pH of an aqueous phase is from 5.5 to 10, when ions in the ink composition are transferred to water. This oil-based ink composition prevents corrosion of a nozzle plate and is improved in storage stability, and thus can ensure printer reliability such as ink-jet stability obtainable even after long storage thereof, and can withstand outdoor service environments.

9 Claims, No Drawings

OIL-BASED INK COMPOSITION

CROSS-REFERENCE TO RELATED APPLICATIONS

This application is a Divisional of application Ser. No. 12/280,962 (U.S. Pat. No. 8,669,318) filed on Aug. 27, 2008. Application Ser. No. 12/280,962 is a National Phase of PCT International Application No. PCT/JP2007/055046 filed on Mar. 14, 2007, which claims priority under 35 U.S.C. 119(a) to Patent Application No. 2006-075299 filed in Japan on Mar. 17, 2006. All of which are hereby expressly incorporated by reference into the present application.

TECHNICAL FIELD

The present invention relates to an oil-based ink composition and particularly to an oil-based ink composition comprising a colorant, an organic solvent and a polymeric compound (a pigment-dispersant and/or a fixing resin).

An oil-based ink composition according to the present invention is used as a printing ink for all modes of recoding systems such as ink jet printing, off-set printing, gravure printing, screen printing and thermal transfer printing, and as an ink for writing utensils, and is preferably used as an ink for ink jet printing.

BACKGROUND ART

Ink jet printing is a recording mode for printing characters, images or diagrams by jetting liquid inks from nozzles to recording media, using a pressure, heat, an electric field or the like as a drive source. Ink jet printing has found an increasing market, because it is lower in running cost and is capable of providing high image quality, and also because various kinds of inks such as water-based inks, oil-based inks, etc. can be used in accordance with end uses.

Under such circumstances, there have been developed large-scale ink jet printers for use together with water-based inks, capable of printing on absorbing recording media such as paper of A-0 size. These ink jet printers are used for printing in-door posters and graphics by CAD, and printing for proofing color matching prior to printing. Such printed matters are laminated for outdoor use.

In these years, a demand for printed matters for outdoor use has been increasing. To meet such a demand, oil-based inks which can be directly printed on plastic films of polyvinyl chlorides or the like have been developed. There also have been developed such oil-based inks that are excellent in waterproofing and weather resistance and can provide printed matters having sufficient scratch resistance without the need of lamination thereof.

As an ink excellent in scratch resistance, an ink comprising a vinyl chloride resin dissolved in an organic solvent is proposed. As an ink excellent in waterproof and weather resistance, an ink comprising a pigment with high fastness dispersed in an organic solvent is proposed.

However, when these oil-based inks are used with printer heads adjusted for conventional water-based inks, they accelerate the corrosion of nozzle plates. Furthermore, when such oil-based inks are left to remain in the printers for a long period of time, their ink-jet stability degrades, which causes problems in practical use, such as degradation of the quality of printed matters.

Factors of such problems are considered to be the use of organic solvents with a high resin-dissolving power so as to dissolve acrylic resins or vinyl chloride resins, the use of acidic pigments which are surface-treated by oxidation or acidic derivatives, and the contents of acidic substances such as chlorine ions and sulfate ions as impurities in dyes. These factors are considered to facilitate chemical corrosion of nozzle plates.

As techniques for preventing the corrosion of nozzle plates, there are known, for example, an oil-based pigment ink capable of inhibiting corrosion of an aluminum electrode head member by the use of a specific amount of an ethanolamine-based compound (cf. JP-A-2005-23099); an oil-based ink capable of inhibiting corrosion of a metal of a head member due to a galvanic action, by the use of 3-methoxy-3-methyl-butyl acetate and a specific resin (cf. JP-A-2004-262985); an oil-based ink capable of preventing corrosion of an ink-repelling-treated head by the use of a diethylene glycol compound and a dipropylene glycol compound in a given mixing ratio (cf. WO2002/055619); and an oil-based dye ink capable of preventing corrosion of an electrode by decreasing the content of a water-soluble inorganic salt (cf. JP-B2-2734032).

Apart from the above-described techniques for preventing the corrosion, several techniques for improving the stability of oil-based inks are known. For example, there are disclosed an oil-based pigment ink capable of maintaining its dispersion stability even after being left to stand for a long period of time, by the use of an acidic carbon black with pH 2.0 to 4.0 as a colorant, together with a specific solvent (cf. JP-A-2001-220527); an oil-based dye ink capable of inhibiting precipitation of a dye during the storage thereof for a long period of time, by the use of a red dye having a specific structure and an alkylamine ethylene oxide derivative (cf. JP-A-2000-212495); and an oil-based dye ink which is improved in dye-dissolution stability by the use of an oil-soluble dye, a petroleum-based solvent and polyoxyethylene alkylamine (cf. JP-B-8-6057/1996).

DISCLOSURE OF THE INVENTION

Problem to be Solved by the Invention

However, the above known oil-based inks are difficult to concurrently satisfy both of the nozzle plate corrosion-preventive effect and the storage stability, especially when an ink-jet printer which comprises a nozzle plate containing nickel as a surface material is used.

An object of the present invention is to provide an oil-based ink composition comprising an organic solvent, which can prevent corrosion of a nozzle plate as one of the problems in the prior art, and which is improved in storage stability and can be stably jet even after being left to stand for a long period of time so that the reliability of a printer can be ensured, and which can withstand outdoor service environments.

Means for Solving the Problem

As a result of the present inventors' intensive studies to achieve the above-described object, first, they found that the chemical corrosion of nozzle plates due to oil-based ink compositions depend on the pH of an aqueous phase which is formed when ions in the oil-based ink compositions are transferred to water.

The present inventors repeated deliberate experiments based on the above finding. As a result, it has been found that the chemical corrosion of nozzle plates can be prevented by controlling the pH of the aqueous phase formed in the above-described ion transference, to a certain value or higher, and it has also been found that the storage stability of the inks can be ensured by controlling the pH of the aqueous phase to a certain value or less. Thus, the nozzle plate corrosion-preventive effect and the storage stability of the ink can be concurrently achieved. Both of these features can be highly achieved, especially when this ink composition is used in an ink jet printer which comprises a nozzle plate containing nickel as a surface material. The present invention is accomplished based on these findings.

According to the present invention, the above-described object can be achieved by an oil-based ink composition comprising a colorant, an organic solvent and a polymeric compound, which has a pH of from 5.5 to 10.0 in an aqueous phase formed when ions in the ink composition are transferred to water, and the object can be achieved especially by an oil-based ink composition which further comprises a pH-adjusting agent in addition to the above components.

Effect of the Invention

As described above, the oil-based ink composition of the present invention, having the above-described specific composition, can prevent the corrosion of nozzle plates and also has improved storage stability, and thus it can be stably jet even after being left to stand for a long period of time so that the reliability of a printer can be ensured. This ink composition can also withstand outdoor service environments. The nozzle plate corrosion-preventive effect and storage stability of the ink can be concurrently and highly achieved, especially when the oil-based ink composition is used in an ink jet printer which comprises a nozzle plate containing nickel as a surface material.

Best Embodiments For Carrying Out The Invention

One of the characteristics of the oil-based ink composition of the present invention is that the pH of an aqueous phase, which is formed when ions in the oil-based ink composition are transferred to water, is from 5.5 to 10.0. The pH of the aqueous phase is determined as follows: first, a predetermined amount of the oil-based ink composition is gradually added dropwise to an amount of ultrapure water while stirring, so as to transfer the ions in the oil-based ink composition to the water; after stirring for a predetermined time, the mixture is repeatedly filtered with a membrane filter until the filtrate becomes clear. The pH of this filtrate is measured to determine the pH of the aqueous phase formed when the ions in the ink composition are transferred to water, as referred to in the present invention.

The chemical corrosion of the nozzle plate is affected by the above-determined pH of the aqueous phase formed when the ions in the oil-based ink composition are transferred to water. When this pH is controlled to 5.5 or higher, a passive layer is formed on the surface of the nozzle plate, so that the chemical corrosion of the nozzle plate can be prevented, even if any electrical potential difference forms. When this pH is controlled to 10.0 or less, the formation of an insoluble material of a resin or agglomeration of a pigment can be suppressed, so that the storage stability of the ink can be properly maintained. This means that a pH of less than 5.5 leads to the corrosion of the nozzle plate, while a pH of more than 10.0 leads to the poor storage stability of the ink.

Especially, even when this oil-based ink composition is used in an ink jet printer which comprises a nozzle plate containing nickel as a surface material, the nozzle plate corrosion-preventive effect and the ink storage stability can be concurrently and highly satisfied by controlling the above pH to a value from 5.5 to 10, preferably from 6.0 to 8.0.

There is no limit in the selection of means for controlling the pH of the aqueous phase within the above-specified range, when the ions in the ink composition are transferred to water. Usually, a suitable pH-adjusting agent is contained in the oil-based ink composition so as to control the pH.

Examples of such a pH-adjusting agent include alkylamine ethylene oxide derivatives, low molecular weight and high molecular weight organic amine compounds, inorganic salts such as sodium carbonate and calcium carbonate, hydroxides such lithium hydroxide, sodium hydroxide, potassium hydroxide, magnesium hydroxide and calcium hydroxide, etc. These pH-adjusting agents may be used alone or they may be used as a mixture of two or more of them.

As the alkylamine ethylene oxide derivative, the compounds of the following formula (1) are preferably used:

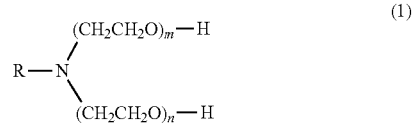

(1)

wherein R represents an alkyl group having 5 to 20 carbon atoms; and m and n are numbers not smaller than zero, provided that the sum of m and n is from 1 to 20. A compound of the formula (1) in which the number of carbon atoms of the alkyl group R and/or the sum (m +n) of m and n are/is outside the above-specified range(s) may be insufficient as the pH-adjusting agent.

Examples of commercially available products of such alkylamine ethylene oxide derivatives include NISSAN NYMEEN L-201, L-202, L-207, S-202, S-204, S-210, S-215 and S-220 (manufactured by NOF Corporation), AMIET 102, 105, 302, 308 and 320 (manufactured by Kao Corporation), Newcoal BB402, LA407 and OD420 (manufactured by NIPPON NYUKAZAI CO., LTD.), NIKKOL TAMNS-5, TAMNS-10, TAMNS-15, TAMNO-5, TAMNO-10 and TAMNO-15 (manufactured by Nikko Chemicals), etc.

Examples of the low molecular weight organic amine compounds include monoethanolamine, diethanolamine, triethanolamine, triethylenetetramine, morpholine, N-methylmorpholine, N-ethylmorpholine, hydroxyethylpiperazine, 2-methylpiperazine, monomethylaminoethanol, monoethylaminoethanol, monobutylaminoethanol, tert-butylaminoethanol, dimethylaminoethanol, diethylaminoethanol, dibutylaminoethanol, diethylaminoisopropanol, monomethylaminodiethanol, monoethylaminodiethanol, monobutylaminodiethanol, etc.

Examples of commercially available products of the high molecular weight organic amine compounds include SOLSPERSE 24000, 32000, 32500, 32550, 32600, 35100, 36600, 37500 and 39000 (manufactured by Lubrizol Corporation), DISPERBYK 101, 109, 130, 161, 162, 163, 164, 165, 166, 167 and 168 (manufactured by BYK-Chemie, Japan), etc.

Among them pH-adjusting agents, the alkylamine ethylene oxide derivatives of the formula (1) are most preferably used in order to satisfy both the nozzle plate corrosion-preventive effect and the ink storage stability. This is because the alkylamine ethylene oxide derivatives have high solubility in organic solvents and have a function to accelerate the pigment-dispersion stability and dye-solubilization. The amount of this derivative to be added is preferably from 0.01 to 5.0% by weight, more preferably from 0.05 to 1.0% by weight, based on the total weight of the ink composition.

The amount of a pH-adjusting agent other than the alkylamine ethylene oxide derivative of the formula (1) may be appropriately selected so that the pH of the aqueous phase can be from 5.5 to 10.0, when the ions in the ink composition are transferred to water. The amount of such a pH-adjusting agent can be easily determined by routine experiments.

Particularly when the ink composition is used in an ink jet printer comprising a nozzle plate containing nickel as a surface material, the low molecular weight organic amine compound is likely to form a complex with nickel, and dissolves the nozzle plate. On the other hand, when the amount of the high molecular weight organic amine compound is increased, the viscosity of the ink increases, and exceeds such a viscosity that can be adapted to the ink jet printer. The inorganic salt or the hydroxide has a limit in solubility in an organic solvent. Therefore, the alkylamine ethylene oxide derivative of the formula (1) is preferred in view of the adaptability to the printer.

In the oil-based ink composition of the present invention, the colorant may be any of known dyes and pigments. Among them, pigments are preferred in view of light resistance. Either inorganic pigments or organic pigments may be used.

The amount of a pigment to be used is usually from 0.1 to 10% by weight, preferably from 0.2 to 7% by weight, more preferably from 0.3 to 6% by weight, based on the total weight of the ink composition, from the viewpoint of the tinting strength and flowability of the ink composition.

Examples of the inorganic pigments include titanium oxide, Chinese white, zinc oxide, lithopone, iron oxide, aluminum oxide, silicon dioxide, kaolinite, montmorillonite, talc, barium sulfate, calcium carbonate, silica, alumina, cadmium red, red iron oxide, molybdenum red, chrome vermilion, molybdate orange, chrome yellow, cadmium yellow, yellow iron oxide, titanium yellow, chromium oxide, viridian, cobalt green, titanium cobalt green, cobalt chrome green, ultramarine blue, Berlin blue, cobalt blue, cerulean blue, manganese violet, cobalt violet, mica, etc. Carbon black such as acidic, neutral or basic carbon is also used as the inorganic pigment.

Examples of the organic pigments include organic pigments of azo type, azomethine type, polyazo type, phthalocyanine type, quinacridone type, anthraquinone type, indigo type, thioindigo type, quinophthalone type, benzimidazolone type, isoindoline type and isoindolinone type.

As pigments for cyan ink compositions, there are used C.I. Pigment Blues 1, 2, 3, 15:3, 15:4, 15:34, 16, 22 and 60. Preferably, at least one selected from C.I. Pigment Blues 15:3 and 15:4, or a mixture of at least two selected therefrom is used.

As pigments for magenta ink compositions, there are used C.I. Pigment Reds 5, 7, 12, 48(Ca), 48(Mn), 57(Ca), 57:1, 112, 122, 123, 168, 184, 202 and 209, and C.I. Pigment Violet 19. Preferably, at least one selected from C.I. Pigment Reds 57:1, 122, 202 and 209 and C.I. Pigment Violet 19, or a mixture of at least two selected therefrom is used.

As pigments for yellow ink compositions, there are used C.I. Pigment Yellows 1, 2, 3, 12, 13, 14C, 16, 17, 73, 74, 75, 83, 93, 95, 97, 98, 109, 110, 114, 120, 128, 129, 130, 138, 150, 151, 154, 155, 180 and 185. Preferably, at least one selected from C.I. Pigment yellows 14, 74, 83, 109, 110, 120, 150, 151, 155 and 180, or a mixture of at least two selected therefrom is used.

As pigments for black ink compositions, HCF, MCF, RCF, LFF and SCF (manufactured by Mitsubishi Chemical Corporation), Monaque and Legal (manufactured by Cabot Corporation), Color Black, Special Black and Printex (manufactured by Degussa-Huls AG), Toka black (manufactured by TOKAI CARBON CO., LTD.), Laven (manufactured by Colombia Chemicals), etc. are used. Preferably, a single pigment selected from HCF #2650, #2600, #2350 and #2300, MCF #1000, #980, #970 and #960, MCF 88, LFFMA 7, MA 8, MA 11, MA 77 and MA 1000 (manufactured by Mitsubishi Chemical Corporation) and Pritex 95, 85, 75, 55, 45 and 25 (manufactured by Degussa-Huls AG), or a mixture of at least two selected therefrom is used.

As the organic solvent to be contained in the oil-based ink composition of the present invention, any of known organic solvents may be used. A particularly preferable organic solvent is a (poly)alkylene glycol derivative. Desirably, a (poly)alkylene glycol derivative is used in combination with a nitrogen-containing heterocyclic compound such as 2-pyrollidone or its derivative, preferably N-alkyl-2-pyrollidone.

The organic solvent is used in an amount of usually from 30 to 99% by weight, preferably from 50 to 98% by weight, based on the total weight of the ink composition. Particularly, a (poly)alkylene glycol derivative is used in an amount of usually from 30 to 99% by weight, preferably from 50 to 90% by weight, based on the total weight of the ink composition. N-Alkyl-2-pyrollidone is used in an amount of usually from 1 to 30% by weight, preferably from 5 to 28% by weight, based on the total weight of the ink composition.

Examples of the (poly)alkylene glycol derivative include (poly)alkylene glycols, compounds each having two free hydroxyl groups such as alkylene glycol; compounds each having one free hydroxyl group, such as monoalkylether or monoalkylester of (poly)alkylene glycol; compounds each having no free hydroxyl group, such as monoalkylether monoalkylester, dialkylether or dialkylester of (poly)alkylene glycol; and the like.

Among them, monoalkylether monoalkylester, dialkylether and dialkylester are particularly preferable as the compounds each having no free hydroxyl group; and monoakylether monoalkylester or dialkylester is most preferable as the compound having an ester group. These compounds give good influence on the flowability, fixing property and storage property of the ink composition.

Specific examples of such a monoalkylether monoalkylester, dialkylester or dialkylether of (poly)alkylene glycol include ethylene glycol monoalkylether monoalkylester, diethylene glycol monoalkyleter monoalkylester, triethylene glycol monoalkylether monoalkylester, tetraethylene glycol monoalkylether monoalkylester, propylene glycol monoalkylether monoalkylester, dipropylene glycol monoalkylether monoalkylester, tripropylene glycol monoalkylether monoalkylester, tetrapropylene glycol monoalkylether monoalkylester, ethylene glycol dialkylester, diethyleneglycol dialkylester, triethylene glycol dialkylester, propylene glycol dialkylester, dipropyleneglycol dialkylester, tripropylene glycol dialkylester, ethylene glycol dialkylether, diethylene glycol dialkylether, triethyleneglycol dialkylether, propylene glycol dialkylether, dipropylene glycol dialkylether, tripropylene glycol dialkylether, etc. These compounds may be used alone, or at least two of them may used as a mixture.

Specific examples of N-alkyl-2-pyrollidone include N-methyl-2-pyrollidone, N-ethyl-2-pyrollidone, N-(2-hydroxyethyl)-2-pyrollidone, N-cyclohexyl-2-pyrollidone, N-octyl-2-pyrollidone, N-dodecyl-2-pyrollidone, N-vinyl-2-pyrollidone, etc. Among them, N-methyl-2-pyrollidone and N-ethyl-2-pyrollidone are most preferable because of the low odor and most excellent fixing properties thereof.

In the oil-based ink composition of the present invention, the polymeric compound is used as a pigment dispersant or/and a fixing resin. When a pigment is used as the colorant, the pigment dispersant should have excellent affinity with the pigment and have a function to stabilize the dispersion of the pigment. A fixing resin should have excellent adhesiveness to a substrate and also a function to impart durability to printed matters.

An effect as the ink is exhibited by appropriately selecting a pigment dispersant or a fixing resin in accordance with the kinds of a colorant, an organic solvent and a printing medium. Depending on the kind of a polymeric compound, the polymeric compound by itself can have both of the above-described functions.

It is desirable to use such a pigment dispersant and such a fixing resin that have as low solubility in water and ethanol as possible.

The pigment dispersant and the fixing resin are left to remain on the surface or the surface layer portion of a substrate after the ink is used for printing by an ink jet recording system, and they are dried and fixed on the substrate. When the resin component is easily soluble in water, the waterproof of the resultant printed matter is insufficient, and thus, such a printed matter is likely to flow down when exposed to rain outdoors. In the meantime, when the printed matter is used as a poster, a coating agent is often sprayed onto the surface of the printed matter for use as the poster. However, many of coating agents contain an alcoholic material as a primary solvent. If the polymeric compound is highly soluble in an alcoholic solvent, the resultant printed matter may flow down due to such a coating agent.

A low molecular weight compound may be used as the pigment dispersant, besides the polymeric compound. However, the polymeric compound is preferably used because of its dispersion stability and the strength of the resultant printed matter such as waterproof and scratch resistance. Examples of such a polymeric compound include the above-described high molecular weight organic amine compounds as the pH adjusting agents. In other words, the high molecular weight organic amine compounds have both functions as the pH adjusting agents and the pigment dispersants. In addition, high molecular weight non-amine compounds having only a functions as the pigment dispersants can be used.

As the fixing resin, preferably, at least one resin selected from the group consisting of acrylic resins, polyester resins, polyurethane resins, vinyl chloride resins and nitrocellulose resins is used. Most of these resins are excellent in fixing properties to vinyl chlorides, and the use of these resins modified in their functional groups and structures makes it possible to control the waterproof, dispersion stability, printing performance, etc. of the ink compositions. Among them resins, polyester resins, polyurethane resins, vinyl chloride resins and nitrocellulose resins are preferred, and vinyl chloride resins are particularly preferred.

Examples of commercially available products of the vinyl chloride resins are SOLBIN (manufactured by Nissin Chemical Industry Co., Ltd.), SEKISUI PVC-TG and SEKISUI PVC-HA (manufactured by Sekisui Chemical Co., Ltd.) and UCAR series (manufactured by Dow Chemical Limited). Examples of commercially available products of the polyester resins are ELITEL (manufactured by UNITIKA Ltd.) and VYLON (manufactured by TOYOBO CO., LTD.).

Examples of commercially available products of the polyurethane resins are VYLON (manufactured by TOYOBO CO., LTD.), NT-HiLamic (manufactured by DAINICHISEIKA COLOR & CHEMICALS MFG. CO., LTD.), CRISVON (manufactured by DAINIPPON INK & CHEMICALS, INC.) and Nipporan (manufactured by NIPPON POLYURETHANE INDUSTRY CO., LTD.). Examples of commercially available products of the nitrocellulose resins are HIG, LIG, SL and VX (manufactured by Asahi Chemical Industry Co., Ltd.), industrial nitrocellulose RS and SS (manufactured by DAICEL CHEMICAL INDUSTRIES, LTD.), etc.

When the polymeric compound is used as the pigment dispersant in the present invention, the amount of the pigment dispersant varies depending on the kinds of a pigment and a solvent for use in dispersion, dispersing conditions and so on. The amount of the pigment dispersant is preferably from 5 to 150% by weight based on the weight of the pigment. Particularly when an organic pigment is used, the amount of the pigment dispersant is more preferably from 40 to 150% by weight based on the weight of the pigment, while an inorganic pigment is used, the amount of the pigment dispersant is more preferably from 5 to 60% by weight based on the weight of the pigment.

When the polymeric compound is used as the fixing resin, the amount of this fixing resin is varied depending on the kind and molecular weight of the resin itself, the kinds of a pigment and a solvent, etc. The amount of the fixing resin is preferably from 5 to 200% by weight based on the weight of the pigment.

When the colorant is a pigment in the oil-based ink composition of the present invention, the pigment, the polymeric compound (as the pigment dispersant) and a part of the organic solvent are pre-mixed, and the mixture is dispersed to prepare an intermediate dispersion. The intermediate dispersion is then mixed with the polymeric compound (as the fixing resin), the remaining organic solvent and the pH-adjusting agent, and the mixture is mixed and dispersed to obtain the oil-based ink composition.

In the preparation of the intermediate dispersion, the pigment, the polymeric compound (as the pigment dispersant) and the part of the organic solvent are sufficiently stirred, mixed and dispersed, using a container-driven medium mill such as a ball mill, a centrifugal mill or a planetary ball mill, a high-speed rotation mill such as a sand mill; a medium-stirring mill such as a stirring tank type mill, or a simple disperser such as a Disper. When the oil-based ink composition is prepared, the intermediate dispersion is admixed with the polymeric compound (as the fixing resin), the remaining organic solvent and the pH-adjusting agent, and the mixture is homogeneously mixed, using a simple stirrer such as a three-one motor, a magnetic stirrer, a Disper, a homogenizer or the like.

Apart from the above-described dispersing means, a mixer such as a line mixer may also be used. Further, a disperser such as a beads mill or a high-pressure jet mill may be used so as to pulverize the precipitated particles. In addition, a centrifugal separator or a filter may be used to remove coarse pigment particles.

The oil-based ink composition of the present invention optionally may contain conventional additives such as a surfactant, a surface conditioner, a leveling agent, an anti-foaming agent, an antioxidant, a charge-imparting agent, a bactericide, an antiseptic, a deodorant, a charge-controlling agent, a wetting agent, a skinning-preventing agent, a perfume, a pigment derivative, etc., in addition to the colorant, the organic solvent, the polymeric compound and optionally the pH-adjusting agent.

The surface tension of the oil-based ink composition of the present invention, particularly the oil-based pigment ink composition for ink-jet recording is preferably from 20 to 35 mN/m at 25° C. The viscosity thereof is preferably from 2 to 20 cp, more preferably from 3 to 15 cp, at 25° C.

The average particle size of the dispersed pigment particles is preferably from 30 to 200 nm, more preferably from 50 to 160 nm. The maximum particle size of the dispersed pigment particles is preferably 1,000 nm or less to avoid clogging of the printer head.

The oil-based ink compositions of the present invention are used as printing inks for all kinds of recording systems such as ink jet printing, off-set printing, gravure printing, screen printing, thermal transfer printing, etc., and as inks for writing utensils. The oil-based ink compositions of the present invention are preferably used as inks for ink-jet printing. Particularly when the oil-based ink compositions of the present invention are used in an ink jet printer which comprises a nozzle plate containing nickel as a surface material, nozzle plate corrosion-preventive effects and ink storage stability can be highly achieved.

EXAMPLES

Hereinafter, the present invention will be described in more detail by Examples. In Examples, "part" is "part by weight", unless otherwise specified.

Example 1

A dispersion liquid A was prepared by dispersing carbon black MA8 (a colorant, a carbon black pigment manufactured by Mitsubishi Chemical Corporation) (25.0 parts), SOLSPERSE 24000 (a pigment dispersant (a primary function) manufactured by Lubrizol Corporation) (12.0 parts) and propylene glycol dimethyl ester (an organic solvent) (63.0 parts), with a paint conditioner (manufactured by TOYO SEIKI CO., LTD.) using zirconia beads with diameters of 0.3 mm, for 2 hours.

The liquid dispersion A (12.0 parts), Solbine C5 (a polymeric compound (a fixing resin), a vinyl chloride resin manufactured by Nissin Chemical Industry Co., Ltd.) (2.6 parts), NISSAN NYMEEN L-207 (manufactured by NOF Corporation, a pH-adjusting agent, an alkylamine ethylene oxide derivative of the formula (1) in which R is a dodecyl group, and the sum of m and n is 7 (m+n=7)) (0.4 part), ethylene glycol monobutylether monomethylester (an organic solvent) (40.0 parts), dipropylene glycol dimethyl ether (an organic solvent) (20.0 parts) and N-methyl-2-pyrrolidone (an organic solvent) (25.0 parts) were measured and charged in a beaker. The mixture was stirred for 30 minutes with a magnetic stirrer, and the resultant composition was suction-filtered with a glass fiber filter GFP (0.8 μm trapping particles, manufactured by KIRIYAMA GLASS WORKS CO.) to obtain an oil-based black ink composition A.

Example 2

A liquid dispersion B was prepared in the same manner as in Example 1, using Fastogen Blue TGR (a colorant, a copper phthalocyanine blue pigment manufactured by DAINIPPON INK & CHEMICALS, INC.) (20.0 parts), SOLSPERSE 5000 (an additive, manufactured by Lubrizol Corporation) (1.0 part), DISPER BYK 161 (a pigment dispersant (a primary function) manufactured by BYK-Chemie, Japan) (35.0 parts) and dipropylene glycol monomethylether monomethylester (an organic solvent) (44.0 parts).

An oil-based cyan ink composition B was prepared in the same manner as in Example 1, using the liquid dispersion B (7.0 parts), UCAR Solution Vinyl Resin VMCC (a polymeric compound (a fixing resin), a vinyl chloride resin manufactured by Dow Chemical Japan Limited) (2.0 parts), NISSAN NYMEEN L-201 (a pH adjusting agent, an alkylamine ethylene oxide derivative of the formula (1) in which R is a dodecyl group, and the sum of m and n is 1 (m+n=1), manufactured by NOF Corporation) (0.5 part), dipropylene glycol monomethylether monomethylester (an organic solvent) (40.5 parts), 3-methoxybutyl acetate (an organic solvent) (30.0 parts) and N-ethyl-2-pyrrolidone (an organic solvent) (20.0 parts).

Example 3

A liquid dispersion C was prepared in the same manner as in Example 1, using Hostaperm Pink EB transp. (a colorant, a quinacridone pigment manufactured by Clariant(Japan) K.K.) (20.0 parts), SOLSPERSE 32500 (a pigment dispersant (a primary function) manufactured by Lubrizol Corporation) (30.0 parts) and ethylene glycol monobutylether monomethylester (an organic solvent) (50.0 parts).

An oil-based magenta ink composition C was prepared in the same manner as in Example 1, using the liquid dispersion C (17.5 parts), VYLON UR 8300 (a polymeric compound (a fixing resin), a polyurethane resin manufactured by TOYOBO CO., LTD.) (4.0 parts), Niccol TAMNS-5 (a pH adjusting agent, an alkylamine ethylene oxide derivative of the formula (1) in which R is a stearyl group, and the sum of m and n is 5 (m+n=5), manufactured by Nikko Chemicals) (0.2 part), ethylene glycol monobutylether monomethylester (an organic solvent) (38.3 parts), dipropylene glycol dimethylether (an organic solvent) (25.0 parts) and N-methyl-2-pyrrolidone (an organic solvent) (15.0 parts).

Example 4

A liquid dispersion D was prepared in the same manner as in Example 1, using Novoperm Yellow 4G (a colorant, an azo pigment manufactured by Clariant(Japan)K.K.) (20.0 parts), SOLSPERSE 32500 (a pigment dispersant (a primary function) manufactured by Lubrizol Corporation) (50.0 parts) and 3-methoxybutyl acetate (an organic solvent) (30.0 parts).

An oil-based yellow ink composition D was prepared in the same manner as in Example 1, using the liquid dispersion D (15.0 parts), nitrocellulose "RS1/4" (a polymeric compound (a fixing resin) manufactured by DAICEL CHEMICAL INDUSTRIES, LTD.) (1.0 part), NISSAN NYMEEN L-201 (a pH adjusting agent manufactured by NOF Corporation) (0.8 part), propylene glycol dimethylester (an organic solvent) (40.0 parts), propylene glycol monomethylether (an organic solvent) (35.0 parts) and cyclohexanone (an organic solvent) (8.2 parts).

Example 5

An oil-based ink composition E was prepared in the same manner as in Example 1, except that dimethylaminoethanol (0.4 part) was added without using NISSAN NYMEEN L-207.

Example 6

An oil-based ink composition F was prepared in the same manner as in Example 2, except that Oil Blue 613 (a colorant, a copper phthalocyanine blue dye manufactured by Orient Chemical Industries, Ltd.) (7.0 parts) was added without using the liquid dispersion B.

Comparative Example 1

An oil-based ink composition G was prepared in the same manner as in Example 1, except that the amount ethylene glycol monobutylether monomethylester was changed to 40.4 parts without using NISSAN NYMEEN L-207.

Comparative Example 2

An oil-based ink composition H was prepared in the same manner as in Example 2, except that the amount of dipropylene glycol monometylether monomethylester was changed to 41.0 parts without using NISSAN NYMEEN L-201.

Comparative Example 3

An oil-based ink composition I was prepared in the same manner as in Example 1, except that dimethylaminoethanol (1.4 parts) was added, and that the amount of ethylene glycol monobutylether monomethylester was changed to 39.0 parts without using NISSAN NYMEEN L-207.

With respect to each of the oil-based ink compositions of Examples 1 to 6 and Comparative Examples 1 to 3, the ions of each ink composition were transferred to water by the following method, and the pH of the aqueous phase was measured. The corrosion of a nozzle plate by the use of each ink composition, the storage stability and the printer operability of each ink composition in an ink jet printer were tested by the following methods. The results are shown in Table 1.

<Measurement of pH>

To transfer the ions of each oil-based ink composition to water, the oil-based ink composition (15 parts) was added dropwise portion by portion to ultrapure water (85 parts) being stirred with a magnetic stirrer, and the mixture was stirred for minutes; and then, the resulting mixture was repeatedly filtered through a membrane filter until the filtrate became clear. The pH of this filtrate was measured with a pH meter pH81 (manufactured by YOKOGAWA ELECTRIC CORPORATION).

<Test for Corrosion-Preventive Effect>

Each oil-based ink composition was charged in the printer head of an ink jet printer MJ 510C (manufactured by SEIKO EPSON CORPORATION), in which the material for the surface of a nozzle plate contained a nickel metal. The oil-based ink composition in the printer head was left to stand in an air-conditioned vessel, which was kept at a temperature of 60° C. and a humidity of 90%, for 7 days. After that, the corroded state of the nozzle plate was observed with a microscope. The evaluation was made as follows: the number of nozzles being corroded, out of total 20 nozzles, was counted; and it was evaluated that the smaller the number, the higher the corrosion-preventive effect the ink had.

<Test for Storage Stability>

Each oil-based ink composition was sealed in a capped bottle and was left to stand in a thermostat of 60° C. for 30 days. After that, the oil-based ink composition was subjected to filtration under reduced pressure with a glass fiber filter GFP (trapping particles with a particle size of 0.8 pm, manufactured by KIRIYAMA GLASS WORKS CO.) to check the residue on the filter. The evaluation was made based on the following criteria:

A: no residue left to remain on the filter
B: a little residue left to remain on the filter
C: not a little residue left to remain on the filter <Test for Printer Operability>

Ink jet printer MJ 510C (manufactured by SEIKO EPSON CORPORATION) was charged with each oil-based ink composition and then was subjected to a continuous printing test so as to check the initial ink-jet stability of the ink composition.

Next, the oil-based ink composition which had been used in the test for storage stability was charged in the printer head which had been used in the test for corrosion-preventive effect, to conduct a continuous printing test so as to check the ink-jet stability of the ink composition which had been left to stand for a long period of time.

The results were evaluated by the following criteria.

TABLE 1

|  | pH | Number of corroded nozzles | Storage stability | Printer operability (initial) | Printer operability (after long storage) |
| --- | --- | --- | --- | --- | --- |
| Ex. 1 | 6.8 | 0 | A | S | S |
| Ex. 2 | 7.6 | 0 | A | S | S |
| Ex. 3 | 6.0 | 0 | A | S | S |
| Ex. 4 | 7.0 | 0 | A | S | S |
| Ex. 5 | 9.4 | 1 | B | A | A |
| Ex. 6 | 7.2 | 0 | A | S | S |
| C. Ex. 1 | 4.8 | 18 | B | A | C |
| C. Ex. 2 | 4.9 | 20 | B | A | C |
| C. Ex. 3 | 10.9 | 6 | C | B | C |

S: no failure in ink-jetting and very stably jetted,
A: slightly curved in ink-jetting path, but stably jetted,
B: curved in ink-jetting path, and a little instably jetted, and
C: frequent printing dislocation, and frequently curved in ink-jetting path, and instably jetted.

As is apparent from the above results, all the oil-based ink compositions of Examples 1 to 6 had pH of from 5.5 to 10.0 in the aqueous phase formed when the ions in the ink composition are transferred to water. Thus, it was found that these oil-based ink compositions are excellent in storage stability and are low in liability to corrode the nozzle plates, showing excellent ink-jet stability both in the initial stage and after the long storage thereof and thus showing excellent printer operability. Especially, the oil-based ink compositions of Examples 1 to 4 and 6 using alkylamine ethylene oxide derivatives as the pH-adjusting agents had pH of from 6.0 to 8.0 in the aqueous phases, thus achieving remarkably excellent results in the respective performance tests as described above.

In contrast, the oil-based ink compositions of Comparative Examples 1 and 2 without using alkylamine ethylene oxide derivatives as the pH-adjusting agents had smaller pH than 5.5 in the aqueous phases formed when ions in the ink compositions are transferred to water. Therefore, these ink compositions were high in liability to corrode the nozzle plates, and were slightly inferior in ink storage stability and also were remarkably inferior in ink-jet stability after the long storage of the ink compositions. Thus, these ink compositions could not have good printer operability.

The oil-based ink composition of Comparative Example 3 using a large amount of dimethylaminoethanol as the pH-adjusting agent had pH exceeding 10.0 in the aqueous phase formed when ions in the ink composition are transferred to water, and thus was inferior in ink storage stability. This ink composition was also higher in liability to corrode the nozzle plate and is lower in ink-jet stability in the initial stage and was also markedly inferior in ink-jet stability after the long storage thereof. Therefore, this ink composition could not have good printer operability.

The invention claimed is:

1. An oil-based ink composition for ink jet printing comprising a colorant, an organic solvent, a polymeric compound and a pigment dispersant, wherein
   an amount of the organic solvent is from 30 to 99% by weight based on the total weight of the ink composition;
   an amount of the polymeric compound is from 5 to 200% by weight based on the weight of the colorant;
   an amount of the pigment dispersant is from 5 to 150% by weight based on the weight of the colorant;
   the ink composition has a surface tension of 20 to 35 mN/m at 25° C.;
   the ink composition has a viscosity of 2 to 20 cp at 25° C.; and
   pH of the aqueous phase is from 5.5 to 8.0 when ions in the ink composition are transferred to water, which pH is obtained by adding 15 parts by weight of the oil-based ink composition to 85 parts by weight of ultrapure water, stirring the mixture, filtrating the mixture to obtain a filtrate, and measuring pH of the filtrate.

2. An oil-based ink composition for ink jet printing comprising a colorant, an organic solvent, a polymeric compound and a pigment dispersant, wherein
   an amount of the organic solvent is from 30 to 99% by weight based on the total weight of the ink composition;
   an amount of the polymeric compound is from 5 to 200% by weight based on the weight of the colorant;
   an amount of the pigment dispersant is from 5 to 150% by weight based on the weight of the colorant;
   the ink composition has a surface tension of 20 to 35 mN/m at 25° C.; and
   pH of an aqueous phase is from 5.5 to 8.0 when ions in the ink composition are transferred to water, which pH is obtained by adding 15 parts by weight of the oil-based ink composition to 85 parts by weight of ultrapure water, stirring the mixture, filtrating the mixture to obtain a filtrate, and measuring pH of the filtrate.

3. An oil-based ink composition for ink jet printing comprising a colorant, an organic solvent, a polymeric compound and a pigment dispersant, wherein
   an amount of the organic solvent is from 30 to 99% by weight based on the total weight of the ink composition;
   an amount of the polymeric compound is from 5 to 200% by weight based on the weight of the colorant;
   an amount of the pigment dispersant is from 5 to 150% by weight based on the weight of the colorant;
   the ink composition has a surface tension of 20 to 35 mN/m at 25° C.; and
   the ink composition has a corrosion-preventive effect that the number of corroded nozzles is 0 when the oil-based ink composition is charged in a printer head of an ink jet printer, in which a material for a surface of a nozzle plate contains a nickel metal, the oil-based ink composition in the printer head is left to stand in an air-conditioned vessel, which is kept at a temperature of 60° C. and a humidity of 90%, for 7 days, and thereafter, the corroded state of the nozzle plate is observed with a microscope, and the number of nozzles being corroded out of total 20 nozzles is counted.

4. A set of oil-based ink compositions for ink jet printing comprising a cyan ink composition, a magenta ink composition, a yellow ink composition and a black ink composition, each ink composition comprising a colorant, an organic solvent, a polymeric compound and a pigment dispersant, wherein
   an amount of the organic solvent is from 30 to 99% by weight based on the total weight of the ink composition;
   an amount of the polymeric compound is from 5 to 200% by weight based on the weight of the colorant;
   an amount of the pigment dispersant is from 5 to 150% by weight based on the weight of the colorant;
   the ink composition has a surface tension of 20 to 35 mN/m at 25° C.; and
   the ink composition has a viscosity of 2 to 20 cp at 25° C.; and
   pH of the aqueous phase is from 5.5 to 8.0 when ions in the ink composition are transferred to water, which pH is obtained by adding 15 parts by weight of the oil-based ink composition to 85 parts by weight of ultrapure water, stirring the mixture, filtrating the mixture to obtain a filtrate, and measuring pH of the filtrate.

5. The oil-based ink composition for ink jet printing according to claim 1, wherein the colorant comprises at least one pigment selected from azo pigments, azomethine pigments, polyazo pigments, phthalocyanine pigments, quinacridone pigments, anthraquinone pigments, indigo pigments, thioindigo pigments, quinophthalone pigments, benzimidazolone pigments, isoindoline pigments, isoindolinone pigments, carbon black and titanium oxide.

6. The oil-based ink composition for ink jet printing according to claim 1, wherein an amount of the colorant is from 0.1 to 10% by weight based on the total weight of the ink composition.

7. The oil-based ink composition for ink jet printing according to claim 1, wherein the organic solvent is at least one (poly)alkylene glycol derivative selected from the group consisting of monoalkylether glycols, monoalkylesters, dialkylethers and dialkylesters of (poly)alkylene.

8. The oil-based ink composition for ink jet printing according to claim 1, wherein the polymeric compound is at least one polymeric compound selected from the group consisting of polyester resins, polyurethane resins and vinyl chloride resins.

9. The oil-based ink composition for ink jet printing according to claim 1, further comprising a pH-adjusting agent.

* * * * *